May 9, 1933.  B. H. BOLAND ET AL  1,908,399
POLISHING DEVICE
Filed Dec. 23, 1931  2 Sheets-Sheet 1
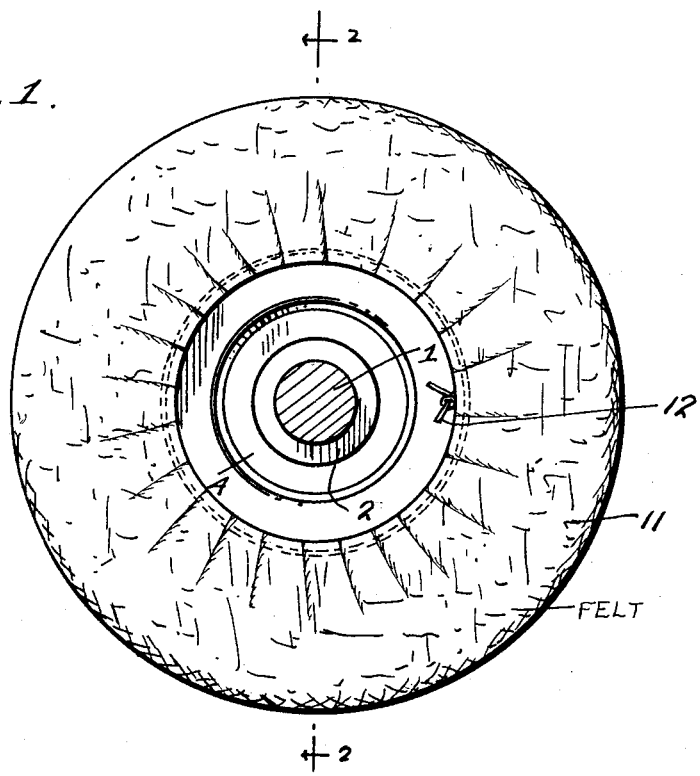
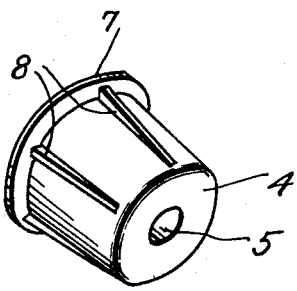
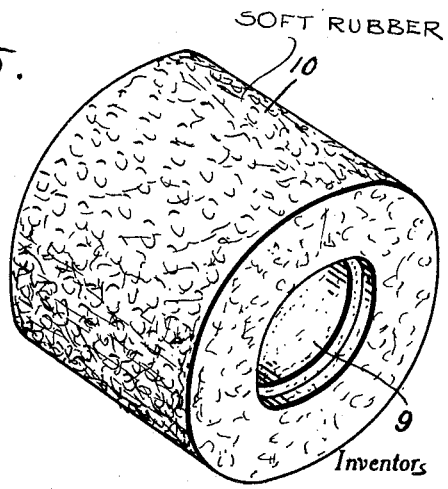
Inventors
B. H. Boland
H. Lind
By Clarence A. O'Brien
Attorney May 9, 1933. B. H. BOLAND ET AL 1,908,399
POLISHING DEVICE
Filed Dec. 23, 1931 2 Sheets-Sheet 2
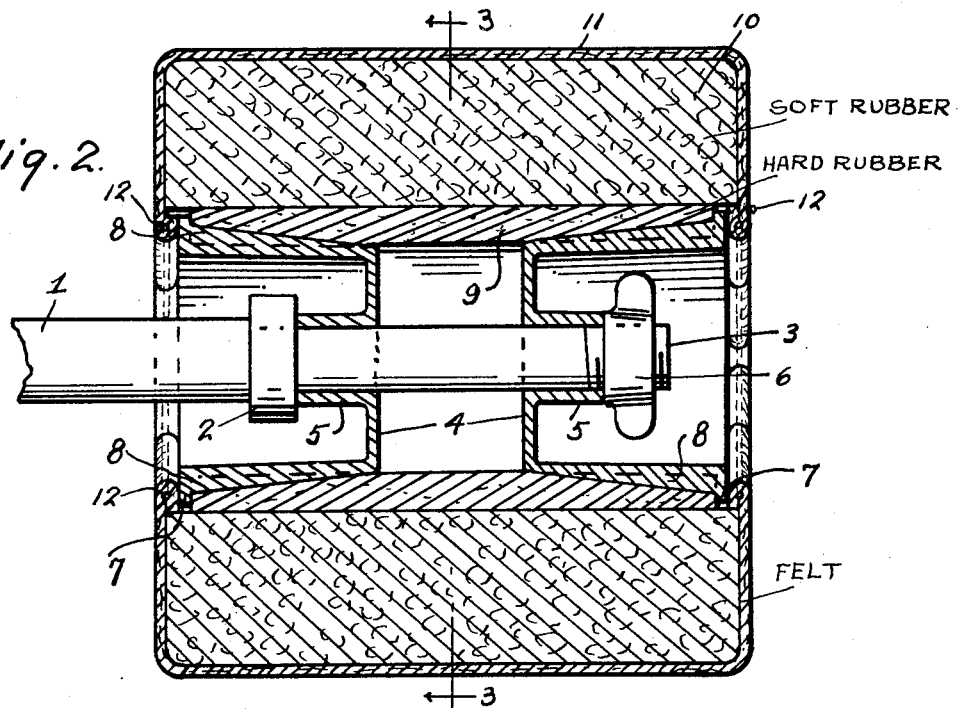
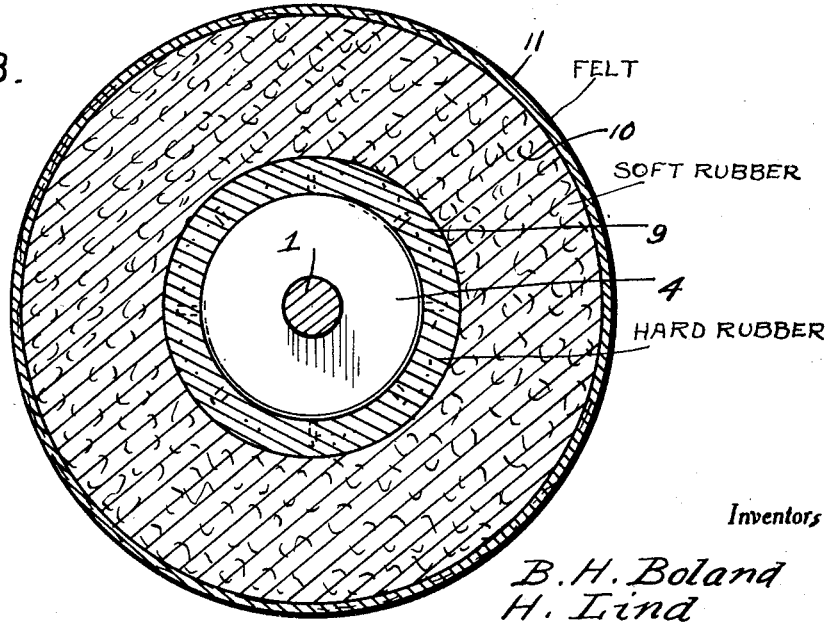
Inventors
B. H. Boland
H. Lind
By Clarence A. O'Brien
Attorney Patented May 9, 1933

1,908,399

UNITED STATES PATENT OFFICE

BENJAMIN H. BOLAND, OF PORT EDWARDS, AND HUGO LIND, OF WISCONSIN RAPIDS, WISCONSIN

POLISHING DEVICE

Application filed December 23, 1931. Serial No. 582,856.

This invention relates to a polishing device which is mainly designed for automobiles but which of course can be used for other purposes, the general object of the invention being to provide a polisher which will eliminate hand polishing and one that will purely and effectively polish an automobile body or the like, without leaving lines or streaks.

In describing the invention in detail, reference will be had to the accompanying drawings wherein like characters denote like or corresponding parts throughout the several views, and in which:—

Figure 1 is an end view of the device with the shaft in section.

Fig. 2 is a section on line 2—2 of Fig. 1.

Fig. 3 is a section on line 3—3 of Fig. 2.

Fig. 4 is a perspective view of one of the conical members.

Fig. 5 is a perspective view of the cylinder with the outer covering removed.

In these drawings the numeral 1 indicates a shaft which is formed with a collar 2 adjacent its threaded end 3 and the numeral 4 indicates a pair of substantially frusto-conical members held on the shaft by the tubular parts 5 through which the shafts passing, one tubular part having an end engaging the collar 2 and the other having its end engaging a nut 6 on the threaded end of the shaft.

The members 4 are placed on the shaft with their smaller ends adjacent each other, and the outer ends are flanged as shown at 7 and ribs 8 are formed on the exterior walls of the said members. These members 4 act as supports for a cylinder 9 of hard rubber or the like, which has its ends abutting the flanges 7 and the ribs 8 act to cause the cylinder to revolve with the members 4 and with the shaft.

As shown, the parts are so arranged that the threaded end of the shaft and the nut 6 are located in one of the members 4, so as to eliminate the danger of these parts injuring the member being polished.

A cylinder 10 preferably of soft pliable sponge rubber, or similar material, is suitably attached to the cylinder 9 with its ends projecting beyond the ends of the members 4 and this cylinder 10 forms a cushion and is covered by a cylindrical cover 11 which has its ends extending over the ends of the cylinder 10 and said ends are held in place by small strings or rubber bands 12, each passing through a hem in the end of the cover 11.

This cover 11 may be formed of very soft woollen felt and is so shaped that it will slip firmly over the sponge rubber cylinder 10 thus making the friction of the rubber cause the cover 11 to rotate with the cylinder. The springs or rubber bands 12 cause a contraction of the ends of the cover and thus keep the cover in position and at the same time allow for rapid as well as easy reversing of the cover when desired.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described our invention, what we claim as new is:—

A polishing device of the class described comprising a cylinder formed of a single piece of relatively hard rubber and of elongated form, a second cylinder formed of a single piece of soft rubber fitting over the first cylinder and having its ends projecting beyond the ends of the first cylinder and a covering of soft material placed on the second cylinder and having its ends extending over the ends of the second cylinder.

In testimony whereof we affix our signatures.

BENJAMIN H. BOLAND.
HUGO LIND.